(12) United States Patent
Asheim et al.

(10) Patent No.: US 11,220,993 B2
(45) Date of Patent: Jan. 11, 2022

(54) ROTOR BLADE WITH SERRATIONS

(71) Applicant: Siemens Gamesa Renewable Energy A/S, Brande (DK)

(72) Inventors: Michael J. Asheim, Littleton, CO (US); Manjinder J. Singh, Broomfield, CO (US)

(73) Assignee: SIEMENS GAMESA RENEWABLE ENERGY A/S

( * ) Notice: Subject to any disclaimer, the term of this patent is extended or adjusted under 35 U.S.C. 154(b) by 139 days.

(21) Appl. No.: 15/574,290

(22) PCT Filed: Apr. 15, 2016

(86) PCT No.: PCT/EP2016/058428
§ 371 (c)(1),
(2) Date: Nov. 15, 2017

(87) PCT Pub. No.: WO2016/184619
PCT Pub. Date: Nov. 24, 2016

(65) Prior Publication Data
US 2018/0142671 A1    May 24, 2018

(30) Foreign Application Priority Data
May 21, 2015 (EP) .................................. 15168714

(51) Int. Cl.
*F03D 1/06* (2006.01)
*B32B 3/30* (2006.01)
*B32B 5/18* (2006.01)

(52) U.S. Cl.
CPC .............. *F03D 1/0675* (2013.01); *B32B 3/30* (2013.01); *B32B 5/18* (2013.01); *F03D 1/0633* (2013.01);
(Continued)

(58) Field of Classification Search
CPC .. F03D 1/0675; F03D 1/0633; F05B 2240/32; F05B 2240/122; F05B 2240/311;
(Continued)

(56) References Cited

U.S. PATENT DOCUMENTS

2007/0011058 A1    1/2007 Dev
2007/0077150 A1    4/2007 Llorente Gonzalez
(Continued)

FOREIGN PATENT DOCUMENTS

CN        201461226 U  *  5/2010
CN        104454379 A     3/2015
(Continued)

OTHER PUBLICATIONS

EPO, Description JP2003254225A, retrieved Jun. 17, 2019, Espacenet. (Year: 2019).*
(Continued)

*Primary Examiner* — David Hamaoui
*Assistant Examiner* — Jesse M Prager
(74) *Attorney, Agent, or Firm* — Schmeiser, Olsen & Watts LLP (57) ABSTRACT

A method using machine learned, scenario based control heuristics including: providing a simulation model for predicting a system state vector of the dynamical system in time based on a current scenario parameter vector and a control vector; using a Model Predictive Control, MPC, algorithm to provide the control vector during a simulation of the dynamical system using the simulation model for different scenario parameter vectors and initial system state vectors; calculating a scenario parameter vector and initial system state vector a resulting optimal control value by the MPC algorithm; generating machine learned control heuristics approximating the relationship between the corresponding scenario parameter vector and the initial system state vector (Continued)

for the resulting optimal control value using a machine learning algorithm; and using the generated machine learned control heuristics to control the complex dynamical system modelled by the simulation model.

15 Claims, 10 Drawing Sheets

(52) U.S. Cl.
CPC ..... *B32B 2603/00* (2013.01); *F05B 2240/122* (2013.01); *F05B 2240/311* (2013.01); *F05B 2240/32* (2013.01); *F05B 2250/11* (2013.01); *F05B 2250/181* (2013.01); *F05B 2250/183* (2013.01); *F05B 2250/184* (2013.01); *F05B 2250/292* (2013.01); *F05B 2250/611* (2013.01); *F05B 2260/96* (2013.01); *F05B 2280/6002* (2013.01); *F05B 2280/6012* (2013.01); *F05B 2280/6013* (2013.01); *Y02E 10/72* (2013.01)

(58) Field of Classification Search
CPC ............ F05B 2250/11; F05B 2250/181; F05B 2250/183; F05B 2250/184; F05B 2250/292; F05B 2250/611; F05B 2260/96; F05B 2280/6002; F05B 2280/6012; F05B 2280/6013; B32B 3/30; B32B 5/18; B32B 2603/00; Y02E 10/721
See application file for complete search history.

(56) References Cited

U.S. PATENT DOCUMENTS

| | | |
|---|---|---|
| 2007/0110585 A1 | 5/2007 | Bonnet |
| 2008/0187442 A1 | 8/2008 | Standish et al. |
| 2010/0143151 A1* | 6/2010 | Kinzie ................. F03D 1/0675 416/248 |
| 2011/0022303 A1 | 1/2011 | Sprigg |
| 2011/0142637 A1* | 6/2011 | Riddell ................ F03D 1/0633 416/62 |
| 2011/0223030 A1 | 9/2011 | Davidson |
| 2012/0013483 A1 | 1/2012 | Jung |
| 2012/0027590 A1 | 2/2012 | Bonnet |
| 2012/0134837 A1 | 5/2012 | Drobietz |
| 2013/0164141 A1* | 6/2013 | Lin ....................... F03D 1/0641 416/223 R |
| 2013/0266441 A1* | 10/2013 | Enevoldsen ............ F03D 1/065 416/1 |
| 2014/0072441 A1* | 3/2014 | Asheim ................. F03D 1/0608 416/241 R |
| 2014/0227101 A1 | 8/2014 | Yao |
| 2014/0301864 A1 | 10/2014 | Singh |
| 2014/0377077 A1 | 12/2014 | Gruber et al. |
| 2015/0078896 A1* | 3/2015 | Oerlemans ............ F03D 1/0641 416/1 |
| 2015/0078910 A1 | 3/2015 | Oerlemans |
| 2016/0312763 A1* | 10/2016 | Arce ..................... F03D 1/0633 |
| 2017/0045031 A1* | 2/2017 | Asheim ................. F03D 1/0633 |
| 2017/0276117 A1* | 9/2017 | Church ................. F03D 1/0625 |
| 2017/0298740 A1* | 10/2017 | Vathylakis ............ F03D 1/0633 |

FOREIGN PATENT DOCUMENTS

| | | | |
|---|---|---|---|
| JP | H11201021 A | | 7/1999 |
| JP | 2003254225 A | * | 9/2003 |
| JP | 2003254225 A | | 9/2003 |
| JP | 2015042864 A | | 3/2015 |
| WO | WO-2013026127 A1 | * | 2/2013 ............. F15D 1/004 |
| WO | WO-2014044412 A1 | * | 3/2014 ........... F03D 1/0675 |
| WO | WO 2015016704 A1 | | 2/2015 |
| WO | WO 2015193654 A1 | | 12/2015 |

OTHER PUBLICATIONS

EPO, Description JP2015042864A, retrieved Jun. 17, 2019, Espacenet. (Year: 2019).*
International Search Report and the Written Opinion; PCT/2016/058428; Siemens Aktiengesellschaft.
Extended European Search Report, Application No. 15168714.2, dated Oct. 28, 2015.
Japanese Office Action dated Jan. 7, 2019 for Application No. 2017-560567.
Non-English Chinese Office Action dated Jul. 12, 2019 for Application No. 201680029482.0.
Non-English Brazilian Office Action dated Jul. 7, 2020 for Application No. BR112017023400-9.

* cited by examiner

ROTOR BLADE WITH SERRATIONS

CROSS-REFERENCE TO RELATED APPLICATIONS

This application claims priority to PCT Application No. PCT/EP2016/058428, having a filing date of Apr. 15, 2016, based off of European Application No. 15168714.2 having a filing date of May 21, 2015, the entire contents of which are hereby incorporated by reference.

FIELD OF TECHNOLOGY

The following relates to a rotor blade for a wind turbine which is configured such that generation of noise in the trailing edge section of the rotor blade is reduced compared to conventional rotor blades. The following furthermore relates to a wind turbine comprising at least one of such a rotor blade.

BACKGROUND

During rotation of a rotor blade about the rotational axis of the rotor of a wind turbine, noise is generally generated at the trailing edge section of the rotor blade. Among other things, the major source of noise is the interaction of turbulent structures in the boundary layer with the trailing edge. Literature shows that most noise is emitted if the angle between the mean flow direction and the trailing edge is about 90 degrees. Additionally, mixing of the flow from suction and pressure side of the rotor blade past the trailing edge, which is also referred to as flow recovery, can lead to turbulence which can also adversely impact the noise generated from the wind turbine.

This noise may be an issue, especially if the wind turbine is installed onshore near a residential area. In this case, threshold values indicating the maximum allowable noise being generated by the wind turbine generally applies.

Thus, a concept how to reduce noise which is generated at the trailing edge section of the rotor blade is highly advantageous.

In the related art, different concepts regarding noise reduction of rotor blades of a wind turbine exist. One approach is the provision of serrations, such as a serrated panel, at the trailing edge section of the rotor blade. Due to the serrations, the angle between the direction of the airflow and the trailing edge is modified. This modification may significantly reduce the generated noise at the trailing edge.

Another approach of noise reduction of rotor blades is the provision of bristles, such as a brush, or a comb at the trailing edge section. An example of a rotor blade of a wind turbine comprising a comb-like structure at the trailing edge has been disclosed in the patent application US 2007/0077150 A1. Therein, a rotor blade with a plurality of flexible bristles, which are aligned in a row and protrude over the trailing edge of the rotor blade, are provided in order to reduce the noise which is generated due to the interaction of the turbulent structures in the boundary layer with the trailing edges as well as the noise due to turbulence generated by the pressure recovery.

However, the noise reduction which can be achieved by applying one of the mentioned concepts may be insufficient and unsatisfying.

SUMMARY

An aspect relates to a rotor blade for a wind turbine with an improved noise reduction potential.

According to one aspect of embodiments of the invention, there is provided a rotor blade for a wind turbine, wherein the rotor blade comprises serrations along at least a portion of the trailing edge section of the rotor blade. The serrations comprise a first tooth and at least a second tooth, wherein the first tooth is spaced apart from the second tooth. Furthermore, the area between the first tooth and the second tooth is at least partially filled with porous material such that generation of noise in the trailing edge section of the rotor blade is reduced.

A key aspect of embodiments of the present invention is that by providing porous material in between two adjacent teeth of the serrations, noise which is generated by the merging airflow from the pressure side and the suction side between the adjacent teeth is reduced. In other words, while in a rotor blade with conventional serrations, the jet of airflow which passes through the teeth, i.e. which passes through the gap or interstice between two adjacent teeth, generate noise due to the pressure recovery from the pressure side and the suction side of the rotor blade, the porous material between the adjacent teeth allows the pressure gradient in the flow direction across the trailing edge to equalize more slowly. Consequently, a reduction in the magnitude of the acoustic emission may be achieved.

A second aspect and further advantage of the present configuration is that the generally finer structures of the porous material compared to the structure of the serrations causes the frequencies of the emitted noise to increase. A noise comprising higher frequencies has the advantages that it is dampened more rapidly in the ambient air than noise with lower frequencies. Thus, the sound pressure level perceived by an observer on the ground is reduced.

In summary, the inventive rotor blade comprising serrations and a porous material in between two adjacent teeth has the double advantage that the intensity of the noise is reduced because the pressure gradient between the suction side and the pressure side has more stable environment to equalize; and the noise which is generated has generally higher frequencies due to the finer structure of the porous material compared to the structure of the serrations. Overall, a significant noise reduction can thus be achieved.

A wind turbine is referred to as a device that converts kinetic energy of the wind into a rotational movement, i.e. into rotational energy of the rotor of the wind turbine. This rotational energy is destined to be used for generating electricity.

The first tooth is spaced apart from the second tooth which has to be understood in that the tip of the first tooth is separated by a gap from the tip of the second tooth. In one alternative, also the basis of both teeth is separated by a pre-determined distance. In another alternative, the first tooth and the second tooth are closely adjacent to each other at their bases and are only separated from each other at their tips.

The area between the first tooth and the second tooth may be partially filled with porous material or even entirely filled with porous material.

In the context of this patent application, a porous material is understood as a material which comprises an open area fraction which is other than zero percent and other than one hundred percent. The open area fraction is defined as the fraction of the open air area compared to the total area covered by the porous material.

Descriptively speaking, any material which is composed by solid sections and by sections with openings is a porous material which is in principle suited to be arranged between adjacent teeth of the serrations of the rotor blade.

Advantageously, the open area fraction of the porous material, i.e. the porosity of the porous material, is greater than 10% and/or smaller than 90%. The exact preferred value of the porosity depends on how quickly the pressure equalization is required. Note that in principle, a lower porosity set up allows for faster equalization/recovery compared to a higher porosity of the porous material. In particular, the porosity of the porous material is greater than 20% and/or smaller than 80%.

The porosity is preferably adjusted to the desired impact of the porous material on the merging airflows between the pressure side and the suction side. The mentioned lower and upper limit for the porosity are considered as particularly suited for an efficient noise reduction.

The porous material may for example be a mesh comprising a plurality of strands which are connected to each other in a regular pattern.

The mesh may for example consist of a first set of parallel strands and a second set of parallel strands and both sets of parallel strands are arranged in a predetermined angle. This predetermined angle may for example be 90°.

An advantage of having a mesh as porous material is that it is readily available and robust. Furthermore, the porosity, which is defined as the fraction of the open air area compared to the total area covered by the mesh, can be adjusted by the thickness of the strands and the distance of adjacent strands.

In another embodiment, the porous material is made of an open cell foam. A foam is understood as a substance that is formed by pockets of gas in a solid.

It is advantageous to use an open cell foam because an open cell foam is characterized by pockets of gas connecting with each other. Thus, the air from the pressure side can flow through a labyrinth of interconnected gas pockets to the suction side and vice versa.

An advantage of choosing an open cell foam as porous material between adjacent teeth is that the porosity of the porous material can be chosen in a relatively broad range and that open cell foam material is readily available. Advantageously, a solid reticulated foam is used.

In another aspect of embodiments of the invention, the porous material comprises a plurality of fibers.

More particularly, the plurality of fibers may also be described as porous material. This way of describing the fibers is based on the understanding of the notion "porous material" as being a material which is composed by solid sections and by sections with openings. In other words, if the area between two adjacent teeth is filled with solid fibers and these fibers occupy thirty percent of this area, this area can be described as being filled with a porous material having a porosity of thirty percent.

Fibers are generally understood as having a length which significantly exceed their thickness. Fibers are also referred to as bristles or brushes. The plurality of fibers may lead to a comb-like structure.

In an embodiment of the invention, the rotor blade has a length of at least twenty meters, in particular at least thirty meters.

In another embodiment of the invention, the chordwise extension of the first tooth is less than five meters, in particular less than three meters.

In yet another embodiment of the invention, the rotor blade comprises serrations along at least a portion of the trailing edge section of the rotor blade, wherein the spanwise extension of the portion of the trailing edge section exceeds fifty centimeters, in particular exceeds one meter.

In another advantageous embodiment, the fibers are arranged substantially parallel to each other. In particular, the substantially parallel fibers are arranged in substantially chordwise direction of the rotor blade. The chordwise direction is defined as being the direction of the chord lines of the rotor blade. The chord lines are perpendicular to the span of the rotor blade and connect the leading edge of the rotor blade with the trailing edge of the rotor blade. The airflow across the suction side or the pressure side typically also flows in substantially chordwise direction.

Particularly, the fibers may be tapered in the direction towards the trailing edge of the rotor blade.

Note that in the context of this patent application, the trailing edge of the rotor blade is defined as being the part of the rotor blade which is located furthest downstream with regard to the airflow flowing across the suction side and the pressure side. The trailing edge is part of the trailing edge section.

The trailing edge of a rotor blade with no serrations or the like typically has the shape of a straight line. In the presence of serrations, the contour of the serrations represents the trailing edge of the rotor blade. In case of a plurality of fibers filled in the area between the serrations, the trailing edge may be formed by both a portion of the contour of the serrations and the outer rim of the fibers—respecting the definition that the trailing edge of the rotor blade is defined as being the part of the rotor blade which is located furthest downstream.

Advantageously, the porous material is made from plastic. Alternatively, any other material, such as metal or fabric, may also be used to fabricate the porous material, in particular the fibers.

Plastic has the advantage that it is relatively inexpensive, readily available, harmless and robust. Particularly the latter point is important as rotor blades are destined to operate many years in harsh conditions. As a repair or substitution of the fibers is complex and expensive, such a long living material as mentioned is preferred.

In another advantageous embodiment, the plurality of fibers comprises a first portion which is arranged within the chordal plane of the rotor blade, and a second portion which is arranged outside the chordal plane of the rotor blade.

The chordal plane is defined as the plane which is defined by the plurality of chord lines of the rotor blade. In the case of an untwisted rotor blade, the chordal plane is a planar plane. In the case of a twisted rotor blade, the chord lines may be arranged such with regard to each other that they are not parallel with each other but that they comprise different angles towards each other. In this case, the chordal plane has the shape of a curved plane.

In particular, all serrations may be arranged within the same plane, preferably the chordal plane of the rotor blade. Then, in a first option, the plurality of fibers may also be arranged within the chordal plane. This has the advantage of ease of manufacturing.

Alternatively, the plurality of fibers in a second portion may also be out of the chordal plane. This has the advantage that the noise reduction capability of the serrations with the fibers may further be improved. In particular, the second portion may be adjacent to the trailing edge of the rotor blade, i.e. downstream. Note that the fibers are permanently bent out of the chordal plane in the second portion of the plurality of fibers. In addition, they may be further bent or deviated out of the chordal plane under certain, in particular heavy, loading of the trailing edge section of the rotor blade. This case is also referred to as a flexible and passively bending trailing edge section.

In an embodiment of the invention, the fibers may be configured as stiff or rigid in this embodiment.

In general and not being limited to the above described specific embodiment, the fibers are advantageously configured to be stiff. This means that under typical operating conditions of the wind turbine, i.e. for wind speeds smaller than twenty meters per seconds, substantially no bending of the fibers occurs.

In another embodiment of the invention, the fibers may feature a certain flexibility such that a certain bending of the fibers even below the mentioned wind speeds of twenty meters per seconds occurs.

The trailing edge of the rotor blade is defined as the line or edge of the rotor blade which is furthest downstream with regard to the airflow flowing across the rotor blade. The plurality of fibers may completely fill the area between the first tooth and the second tooth. Thus, the trailing edge can be described as a substantially straight line.

Alternatively, it may be advantageous to arrange the plurality of fibers such that it fills the whole area adjacent to the tips of the teeth but that it does not completely fill the part of this area in the middle between two adjacent teeth. This results in a trailing edge which is shifted towards the leading edge of the rotor blade between two adjacent teeth.

The first tooth and/or the second tooth may have a triangular shape as viewed in a top view onto the serrations. In particular, the triangular shape may be described as having a tip and a base wherein the tip is directed towards the trailing edge, i.e. it may even be a part of the trailing edge, and the base of the tooth is directed towards the leading edge of the rotor blade. This shape and orientation of the teeth has been proven as particularly advantageous for load reduction, noise reduction and lift increase of the rotor blade.

The inventive concept of embodiments of the present invention, which aims to reduce the generation of noise in the trailing edge section of a rotor blade for a wind turbine, may alternatively be described as follows:

As seen in chordwise direction from the leading edge towards the trailing edge of the rotor blade, the trailing edge section starts with a base line, which extends substantially perpendicular to the chordwise direction. Continuing further towards the trailing edge, the trailing edge section comprises a first region. The first region is characterized by substantially solid material. The first region is limited at the one side by the base line and at the other side by a first dividing line. Continuing further towards the trailing edge, the trailing edge section further comprises a second region. The second region is characterized by substantially porous material. The second region is limited at the one side by the first dividing line and at the other side by a second dividing line. The second dividing line coincides with the trailing edge of the rotor blade.

The first and second dividing lines may in principle have any shape: They may be periodic or non-periodic, straight or curved, its derivatives may be continuous or discontinuous in spanwise direction, et cetera. Some possible design choices are disclosed in the drawings and the accompanying description. The only requirement according to this aspect of embodiments of the invention is that the first dividing line is not arranged further towards the trailing edge than the second dividing line. In other words, it may be the case that the first region characterized by solid material extends until the trailing edge in certain spanwise regions, but it may not be the case that the second region characterized by the porous material is between the base line and the first region as seen from a chordwise direction from the leading edge to the trailing edge. Descriptively speaking, the first and second region are arranged such that the air first flows across the first, solid region and subsequently across the second, porous region and not the other way round.

The following is further directed towards a wind turbine comprising at least one rotor blade as described above.

BRIEF DESCRIPTION

Some of the embodiments will be described in detail, with references to the following figures, wherein like designations denote like members, wherein.

DETAILED DESCRIPTION

The illustration in the drawings is in schematic form. It is noted that in different figures, similar or identical elements may be provided with the same reference signs.

Figure 1:
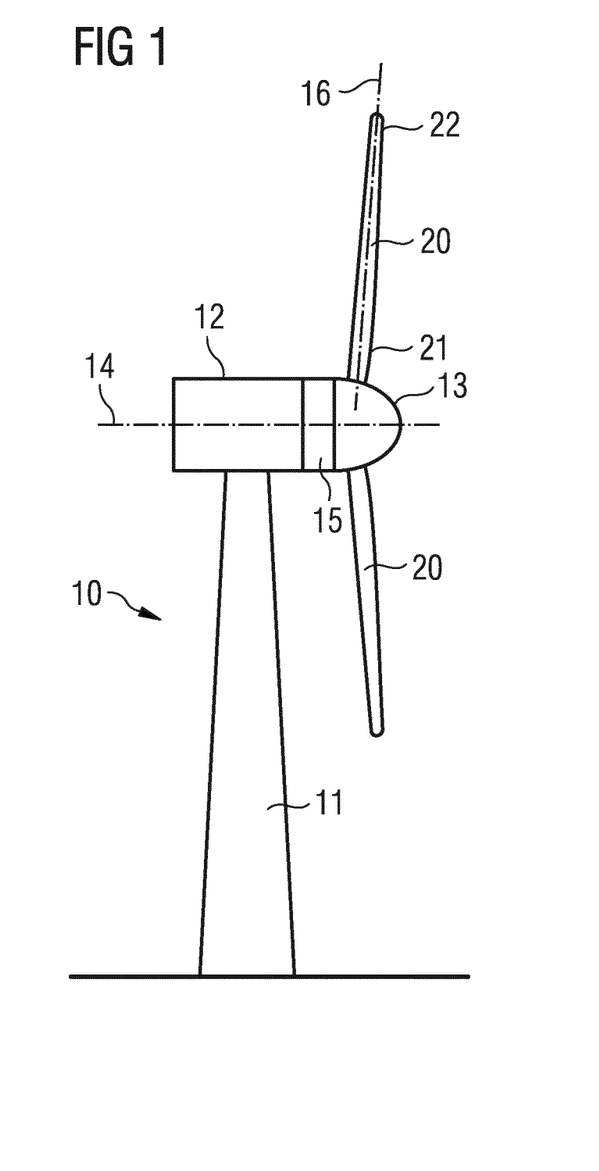
FIG. 1 shows a wind turbine.

In FIG. 1, a wind turbine 10 is shown. The wind turbine 10 comprises a nacelle 12 and a tower 11. The nacelle 12 is mounted at the top of the tower 11. The nacelle 12 is mounted rotatable with regard to the tower 11 by means of a yaw bearing. The axis of rotation of the nacelle 12 with regard to the tower 11 is referred to as the yaw axis.

The wind turbine 10 also comprises a hub 13 with three rotor blades 20 (of which two rotor blades 20 are depicted in FIG. 1).

The hub 13 is mounted rotatable with regard to the nacelle 12 by a main bearing. The hub 13 is mounted rotatable about a rotor axis of rotation 14.

The wind turbine 10 furthermore comprises a main shaft, which connects the hub 13 to a rotor of a generator 15. The hub 13 is connected directly to the rotor of the generator 15, thus the wind turbine 10 is referred to as a gearless, direct driven wind turbine. As an alternative, the hub 13 may also be connected to the rotor of the generator 15 via a gearbox. This type of wind turbine is referred to as a geared wind turbine.

The generator 15 is accommodated within the nacelle 12. It comprises the rotor and a stator. The generator 15 is arranged and prepared for converting the rotational energy from the rotor into electrical energy.

Figure 2:
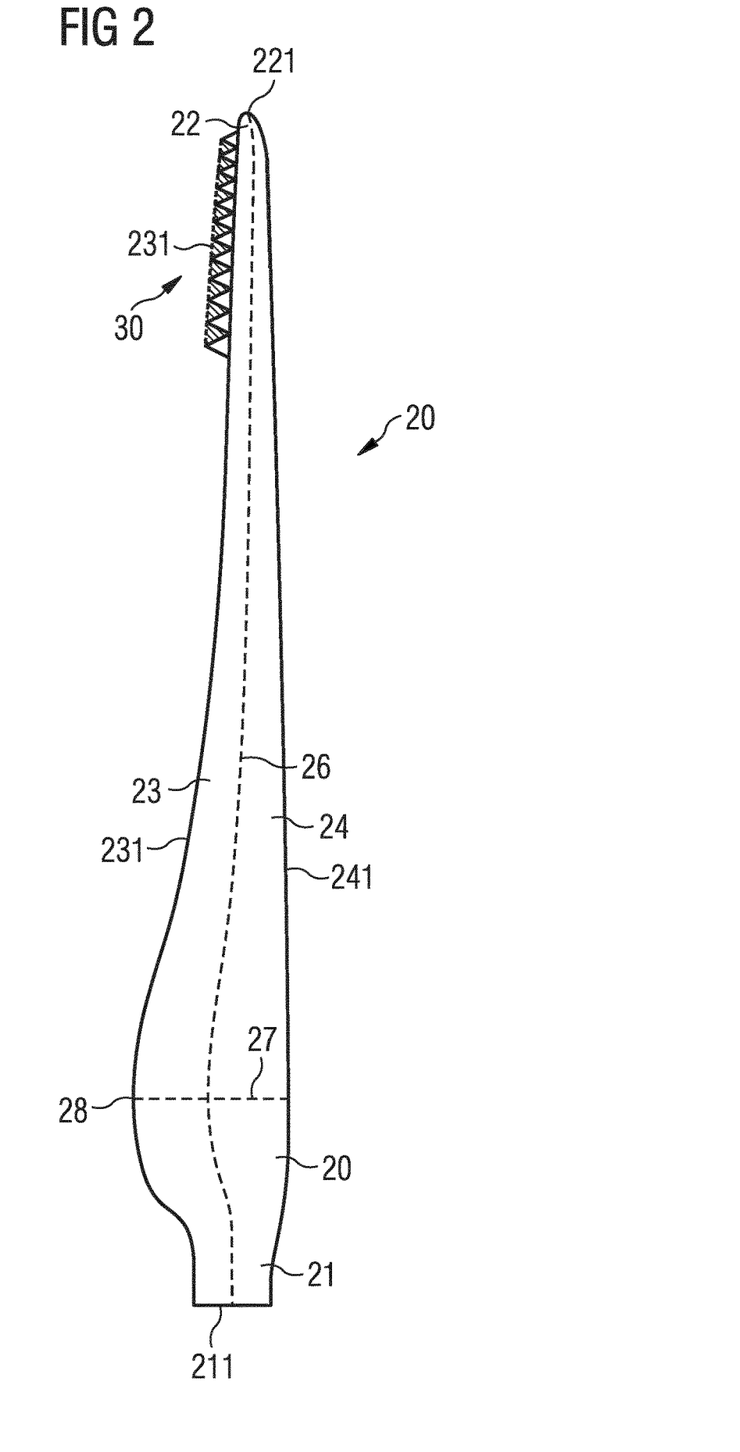
FIG. 2 shows an inventive rotor blade for a wind turbine.

FIG. 2 shows a rotor blade 20 of a wind turbine. The rotor blade 20 comprises a root section 21 with a root 211 and a tip section 22 with a tip 221. The root 211 and the tip 221 are virtually connected by the span 26 which follows the shape of the rotor blade 20. If the rotor blade were a rectangular shaped object, the span 26 would be a straight line. However, as the rotor blade 20 features a varying thickness, the span 26 is slightly curved, i.e., bent as well. Note that if the rotor blade 20 was bent itself, then the span 26 would be bent, too.

The rotor blade 20 furthermore comprises a leading edge section 24 with a leading edge 241 and a trailing edge section 23 with a trailing edge 231.

The trailing edge section 23 surrounds the trailing edge 231. Likewise, the leading edge section 24 surrounds the leading edge 241.

At each spanwise position, a chord line 27 which connects the leading edge 241 with the trailing edge 231 can be defined. Note that the chord line 27 is perpendicular to the span 26. The shoulder 28 is defined in the region where the chord line comprises a maximum chord length.

FIG. 2 furthermore discloses serrations 30 which are located in the outboard section of the rotor blade 20. More particularly, the serrations 30 are located at the trailing edge section 23 of the rotor blade 20. The serrations 30 comprise a plurality of adjacent teeth. The chordwise extension of the teeth is decreasing towards the tip 221 of the rotor blade 20. Note that a plurality of fibers is entirely filling the area between adjacent teeth of the serrations 30 (symbolized by the hatched area). The trailing edge 231 in the outboard section of the rotor blade where the serrations 30 are attached is represented by the outermost part of the fibers and the tips of the serrations 30.

Figure 3:
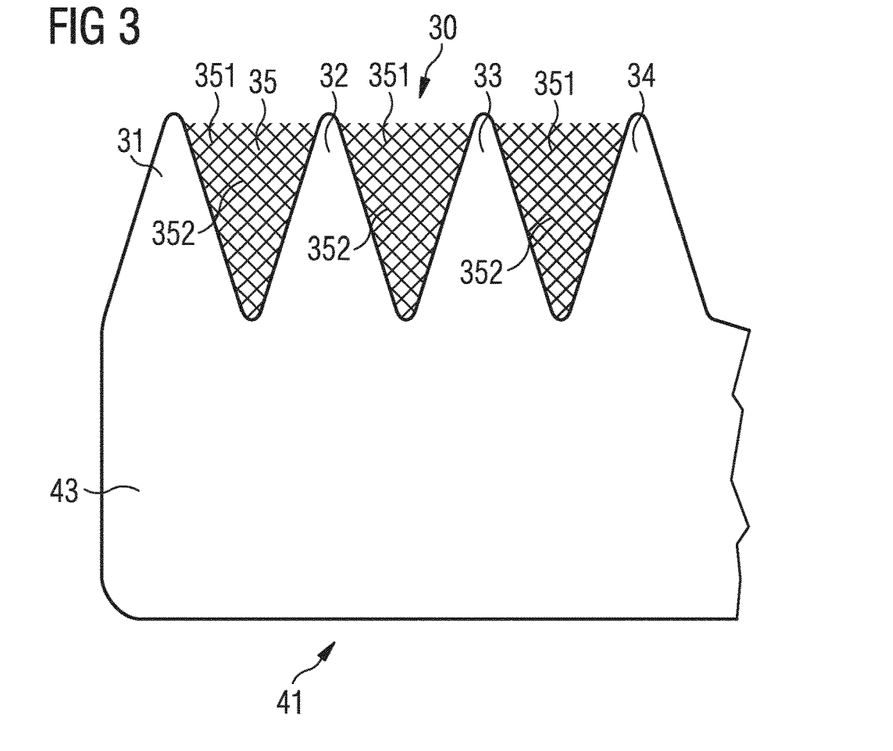
FIG. 3 shows a serrated panel with porous material between adjacent teeth.

FIG. 3 shows a serrated panel 41 which is arranged and prepared for being attached to a rotor blade for a wind turbine. The serrated panel 41 comprises a porous material between its serrations. Exemplarily, the serrated panel 41 is made of plastic and has been produced by injection molding. The serrated panel 41 comprises an attachment portion 43 which is arranged and prepared for attaching the serrated panel 41 to the remaining part of the rotor blade. The serrated panel 41 furthermore comprises a portion with serrations 30. The serrations comprise a plurality of teeth. In particular a first tooth 31, a second tooth 32, a third tooth 33 and a fourth tooth 34 are illustrated in FIG. 3. All teeth 31-34 shown in FIG. 3 have substantially the same shape, namely a triangular shape as seen in a top view. The triangles comprise rounded tips. Alternatively, the triangle-shaped teeth may also comprise a sharp tip. In the area 35 between the first tooth 31 and the second tooth 32 a mesh is placed. The mesh serves as porous material for modifying the recovery of the pressure gradient from the pressure side to the suction side in a favorable, noise reducing way. Furthermore, the mesh is designed to shift the frequencies of the generated noise to higher values. The mesh is made of a plurality of first strands which are substantially parallel to each other and which cross a plurality of second strands which themselves are substantially parallel to each other as well. Thus, a regular and reproducible porous material is obtained. The mesh fills the whole area 35 between the first tooth 31 and the second tooth 32. It also covers the areas between the further teeth 32, 33, 34 of the serrations 30.

Note that the rotor blade may also comprise a plurality of serrated panels 41 with one panel being lined up next to each other in spanwise direction. Adjacent panels may advantageously overlap at its sides in order to reduce whistle tones which otherwise might be generated at the border where two adjacent panels meet.

Figure 4:
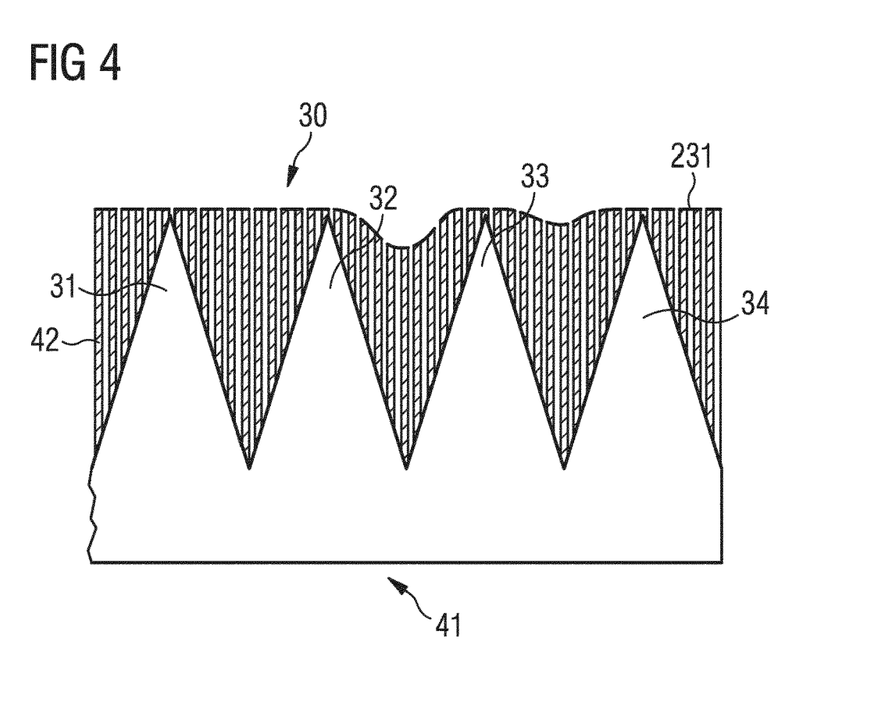
FIG. 4 shows serrations with a plurality of fibers in a first embodiment.

FIG. 4 shows another serrated panel 41. In this embodiment, the porous material is realized by a set of fibers 42. These fibers 42, which can also be described as bristles or needles, are orientated in substantially chordwise direction of the rotor blade. This has to be understood that the serrated panel 41 is arranged and prepared to be attached to the remaining part of the rotor blade in such a manner that the fibers 42 are orientated in chordwise direction after attaching the serrated panel 41 to the remaining rotor blade. Note that the fibers 42 between the first tooth 31 and the second tooth 32 all end at approximately the same chordwise position. Thus, a straight trailing edge 231 is obtained.

In contrast to that, the length of the fibers between the second tooth 32 and the third tooth 33 as well as between the third tooth 33 and the fourth tooth 34 are varying. This leads to a trailing edge 231 which is retracted, i.e. shifted towards the leading edge once the serrated panel 41 has been attached to the remaining rotor blade. Such a shape of the fibers 42 has the advantage that more flexibility in the design of the porous material is given and further improvement potential regarding noise reduction is given. In the embodiment of FIG. 4 only a variation in the length of the fibres 42 is realized. This means that still all fibers 42 are arranged within the chordal plane of the rotor blade.

Figure 5:
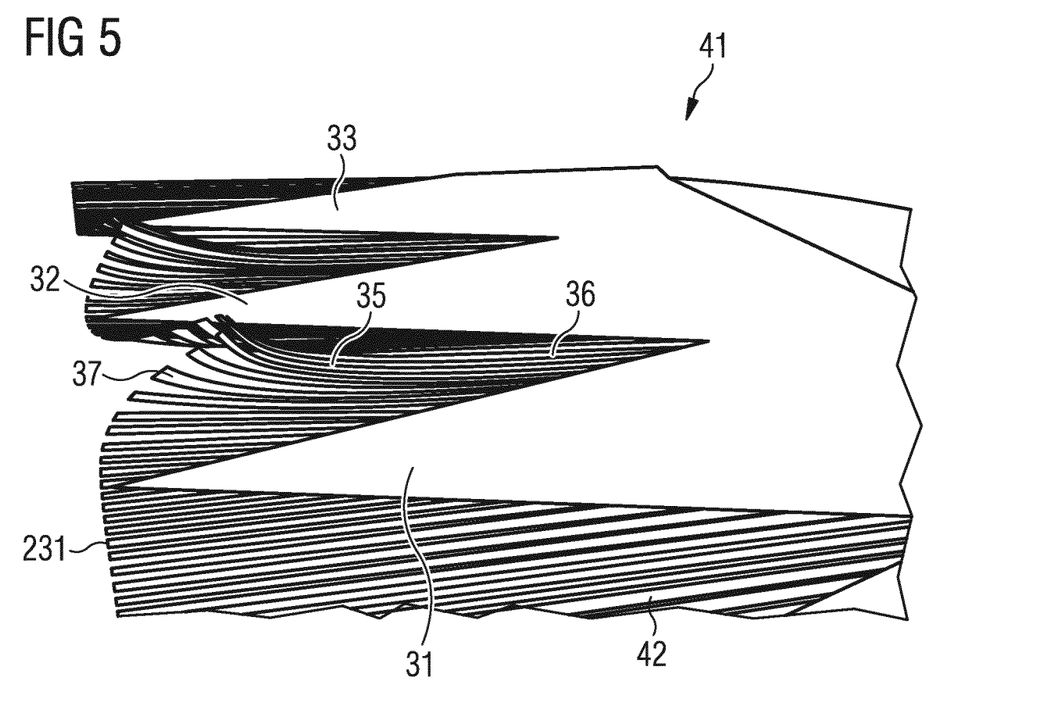
FIG. 5 shows serrations with a plurality of fibers in a second embodiment.

FIG. 5 shows an embodiment of the invention wherein the fibers 42 are within the chordal plane in a first portion 36, but which are outside of the chordal plane in a second portion 37. Thus, an undulating or wavy shape of the porous material as viewed in a cross-sectional view is obtained. This design also has the potential of further improvement of noise reduction. Note that FIG. 5 illustrates a permanent deflection of the fibers 42 out of the chordal plane in the second portion 37 and not a bending of the fibers 42 under extreme loading. Variations in the orientation of the fibers 42 due to loading of the fibers 42 may additionally occur.

It may be advantageous that the fibers 42 are tapered towards the trailing edge 231. This may be advantageous in terms of structural considerations.

Regarding the length variations of the fibers, a sine wave shape may be particularly advantageous.

Exemplary dimensions of a fiber between adjacent teeth may be two millimeters in diameter and between one and ten centimeters in length.

FIGS. 6 to 12 disclose exemplary embodiments how the serrations and the plurality of fibers may be concretely configured and arranged.

Figure 6:
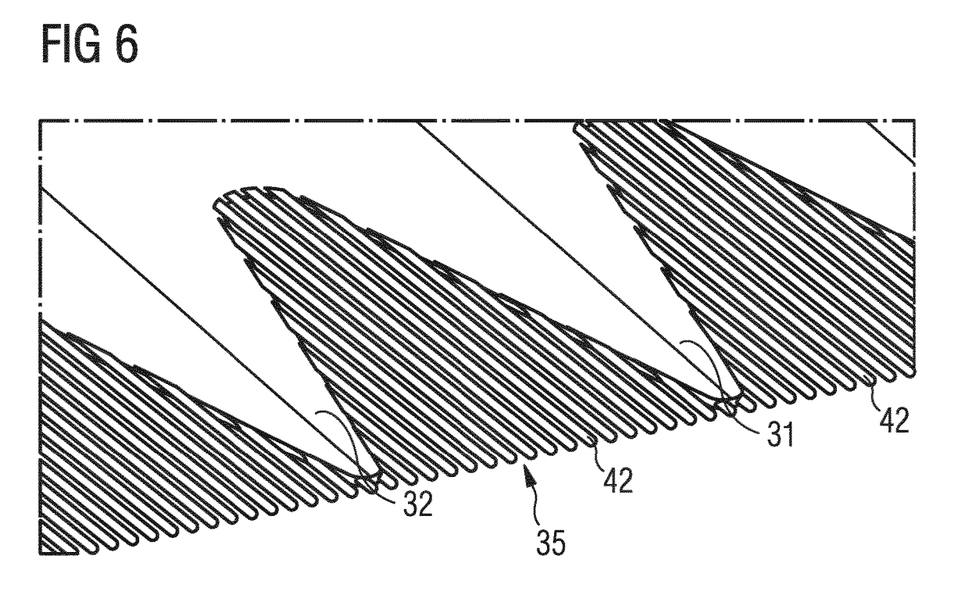
FIG. 6 shows serrations with a plurality of fibers in a third embodiment.

FIG. 6 shows a first tooth 31 and a second tooth 32, being separated and spaced apart by an area 35. In this area 35, a plurality of fibers 42 is arranged. The fibers 42 are orientated substantially parallel to each other. Additionally, the fibers 42 are orientated substantially parallel to the chordwise direction of the rotor blade at this radial position, i.e. at this spanwise position.

In comparison to FIGS. 4 and 5, which illustrate the arrangement of the fibers 42 between the teeth 31, 32, 33, 34 in a more schematic way, FIG. 6 seeks to illustrate an exemplary configuration and arrangement of the fibers 42 in a more detailed manner. For instance, the fibers 42 are depicted as three-dimensional objects, showing that the fibers 42 may in practice advantageously have a certain thickness in order to provide the desired stiffness. As a result, the fibers 42 do not substantially bend during standard operation conditions of the wind turbine, as neither the serrations 31, 32 do.

Figure 7:
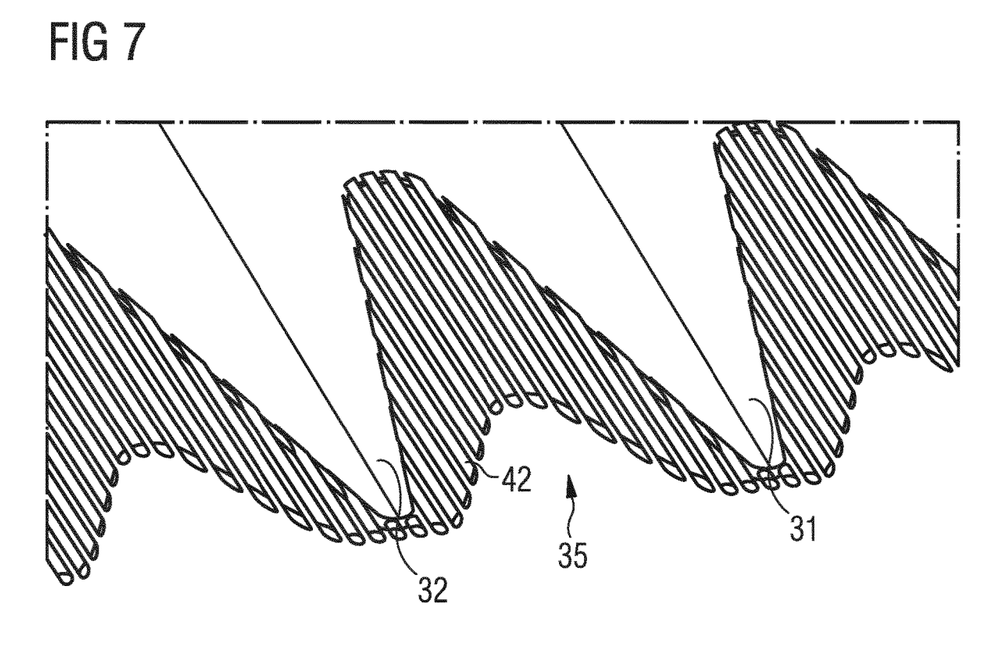
FIG. 7 shows serrations with a plurality of fibers in a fourth embodiment.

FIG. 7 shows an alternative embodiment of the invention. The only difference of this embodiment compared to the embodiment as illustrated in FIG. 6 is the chordwise length of the fibers 42. While in the embodiment of FIG. 6 the lengths of the fibers are chosen such that the result is a straight trailing edge of the rotor blade, in the embodiment of FIG. 7 the fibers in the center portion of the area 35 between adjacent teeth 31, 32 are chosen to have a comparatively shorter length.

Figure 8:
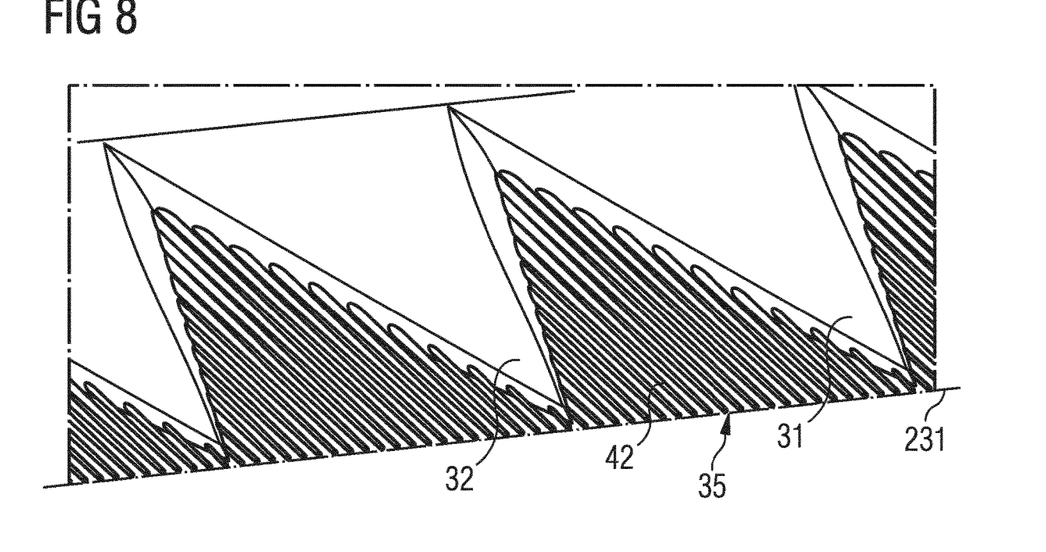
FIG. 8 shows serrations with a plurality of fibers in a fifth embodiment.

FIG. 8 illustrates another variant of how to configure and arrange the fibers 42. Like in the embodiment of FIG. 6, the lengths of the fibers 42 are chosen such that the result is a straight trailing edge 231 of the rotor blade. As a difference, the thickness of the fibers 42 decreases towards the respective tips of the fibers 42. In other words, the fibers 42 are tapered towards the tip. Optionally, the teeth 31, 32 of the serrations may also feature a decreasing thickness.

FIGS. 9 to 12, and 23 show various examples how serrated panels with fibers can be combined with other aerodynamic devices.

Figure 9:
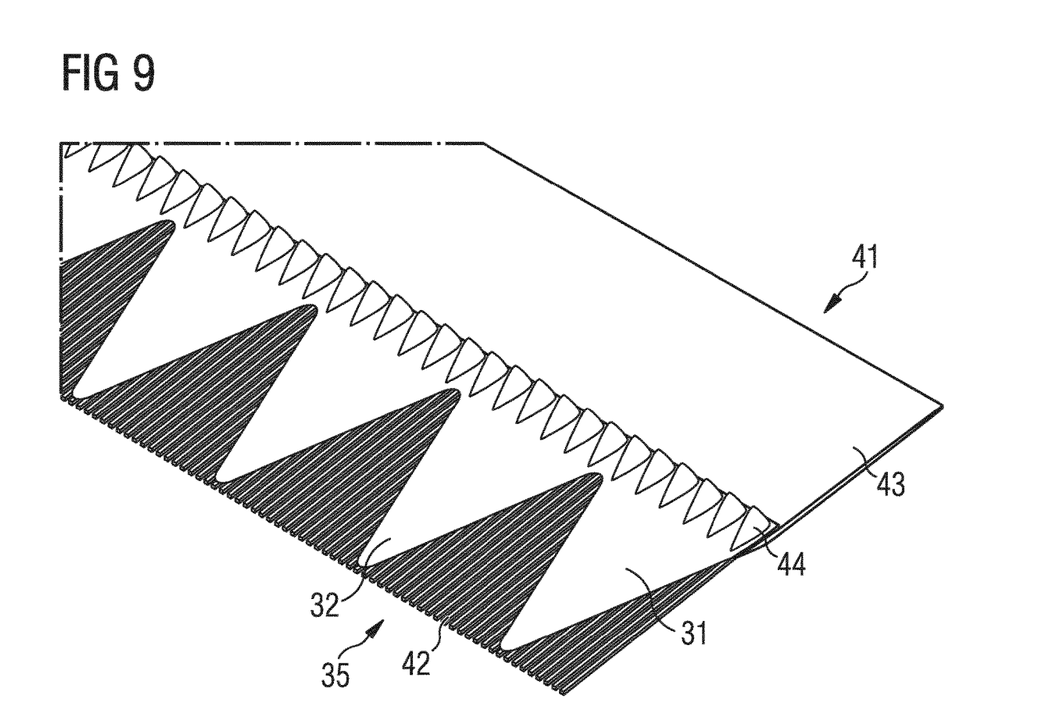
FIG. 9 shows serrations with fins on one side and a plurality of fibers.

FIG. 9 illustrates the arrangement of fins 44 upstream of the teeth 31, 32 of the serrated panel 41. The fins 44 can be seen as another means to manipulate the airflow across the rotor blade such that eventually the noise, which is generated in the trailing edge section of the rotor blade, is reduced. The fins 44 may be arranged on one side of the serrated panel 41, e.g. at the suction side.

Figure 10:
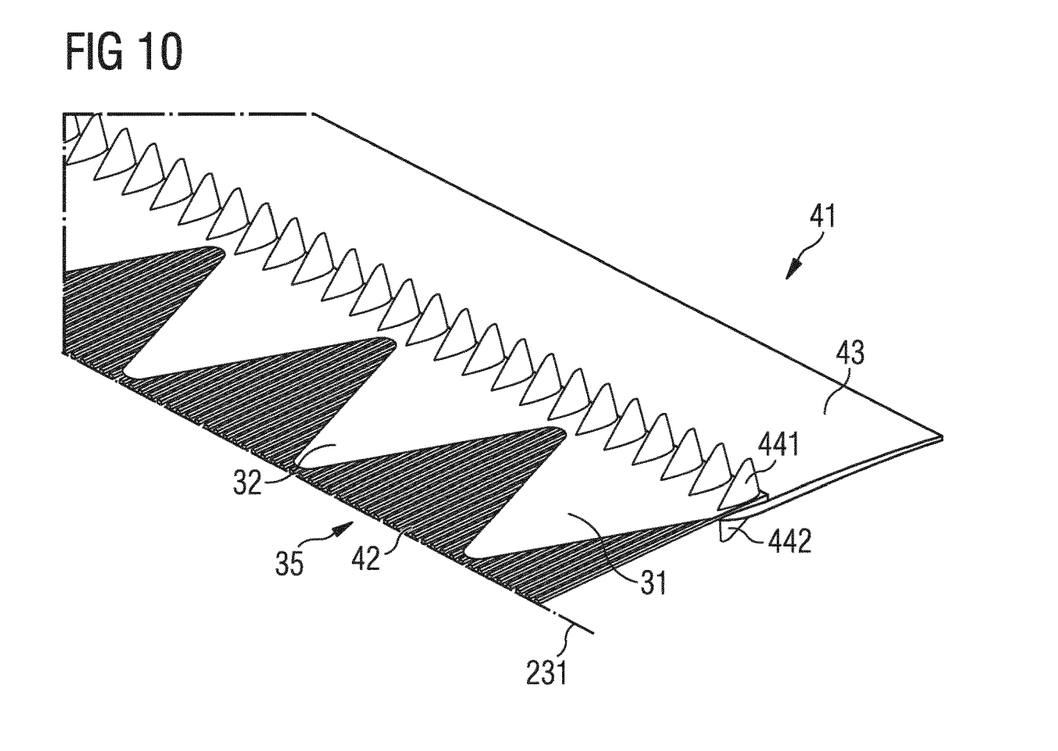
FIG. 10 shows serrations with fins on both sides and a plurality of fibers.
Figure 23:
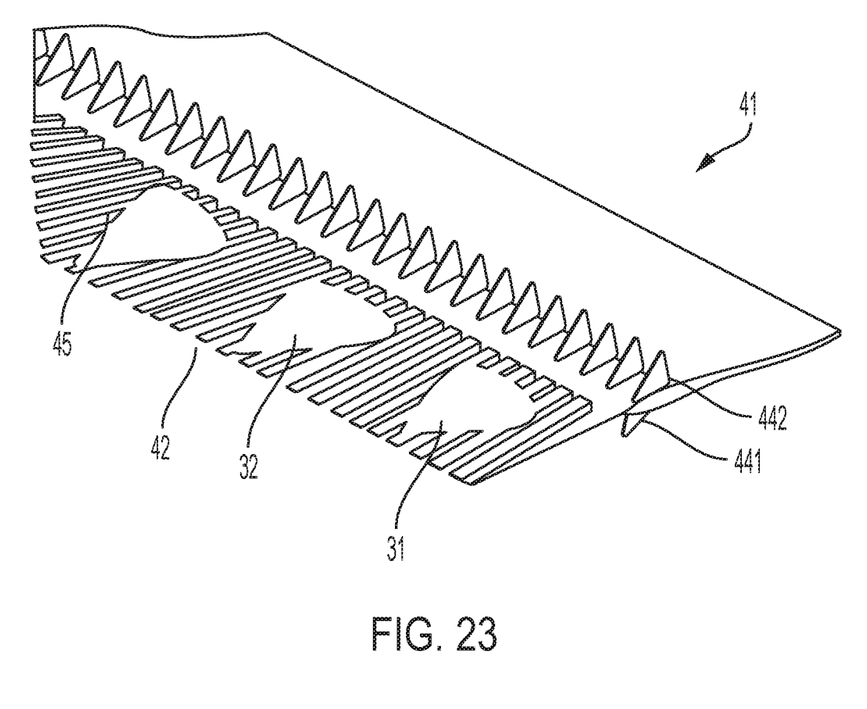
FIG. 23 is serrations with fins and ridges.

The fins 44 may alternatively also be arranged on both sides of the serrated panel, i.e. at both the pressure and the suction side. Such an embodiment is illustrated in FIGS. 10 and 23 The fins which are arranged at the suction side of the rotor blade are referred to as suction side fins 441 (shown in FIGS. 10 and 23), the fins which are arranged at the pressure side of the rotor blade are referred to as pressure side fins 442 (shown in FIGS. 10 and 23).

Figure 11:
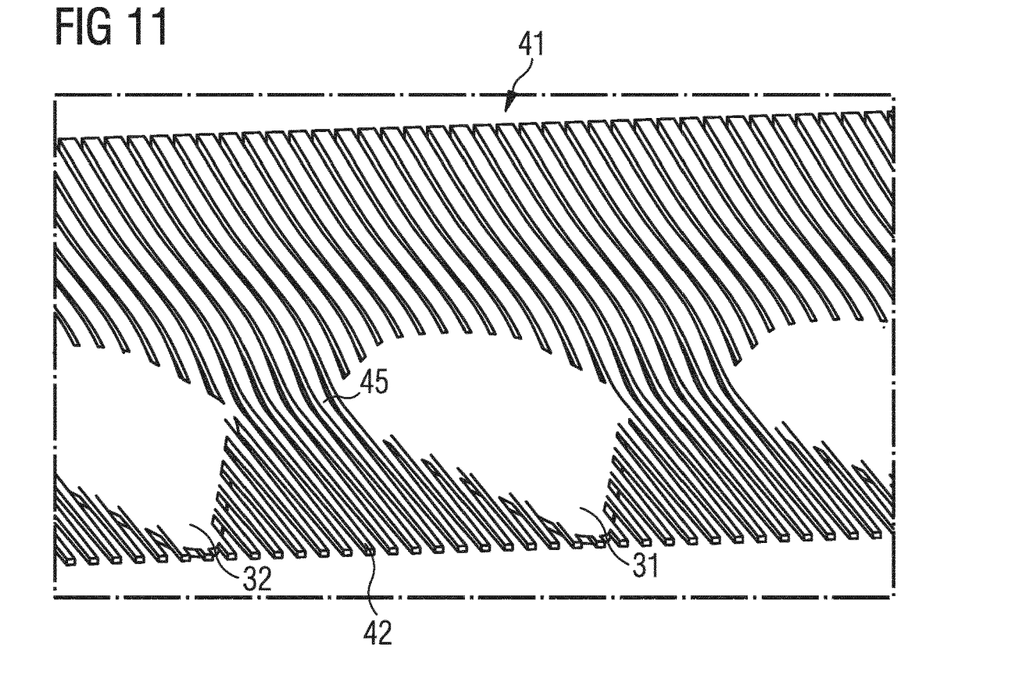
FIG. 11 shows serrations with ridges and a plurality of fibers.

FIG. 11 illustrates an embodiment of a serrated panel 41 with ridges 45. The ridges 45 have the objective to guide the airflow and/or break up spanwise coherence of the airflow. The ridges may be arranged at the pressure side of the rotor blade (as in the example shown in FIG. 11 and 23), at the suction side of the rotor blade, or on both sides. The ridges 45 may be arranged upstream of the serrations and may extend the fibers 42.

FIGS. 12 to 22 show eleven different variants how to arrange a region of porous material at the trailing edge section 23 of a rotor blade.

As seen in chordwise direction 271 from the leading edge towards the trailing edge of the rotor blade, the trailing edge section 23 starts with a base line f0, which extends substantially perpendicular to the chordwise direction 271. Continuing further towards the trailing edge 231, the trailing edge section 23 comprises a first region 52. The first region 52 is characterized by substantially solid material. The first region 52 is limited at the one side by the base line f0 and at the other side by a first dividing line f1. Continuing further towards the trailing edge 231, the trailing edge section 23 further comprises a second region 53. The second region 53 is characterized by substantially porous material. The second region 53 is limited at the one side by the first dividing line f1 and at the other side by a second dividing line f2. The second dividing line f2 coincides with the trailing edge 231 of the rotor blade.

The first and second dividing lines f1, f2 may in principle have any shape: They may be periodic or non-periodic, straight or curved, its derivatives may be continuous or discontinuous (in spanwise direction 272), et cetera. Some possible design choices are disclosed in FIGS. 12 to 22.

Figure 12:
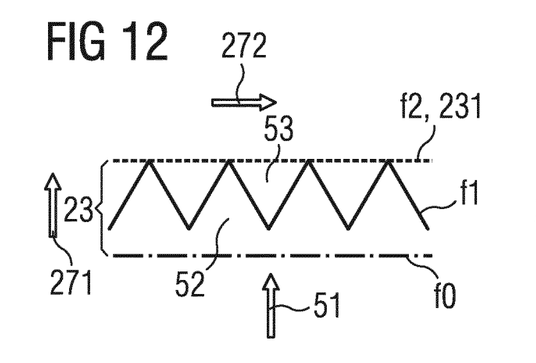
FIG. 12 shows a first variant how to arrange a region of porous material at the trailing edge section of a rotor blade.

In FIG. 12, the first dividing line f1 is serrated and the second dividing line f2 is straight.

Figure 13:
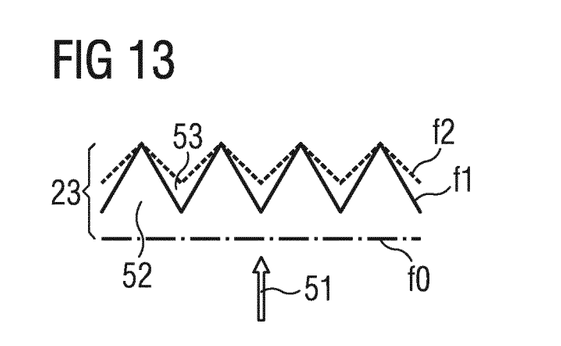
FIG. 13 shows a second variant how to arrange a region of porous material at the trailing edge section of a rotor blade.

In FIG. 13, both the first dividing line f1 and the second dividing line f2 are serrated. Both dividing lines f1, f2 have the same periodicity.

Figure 14:
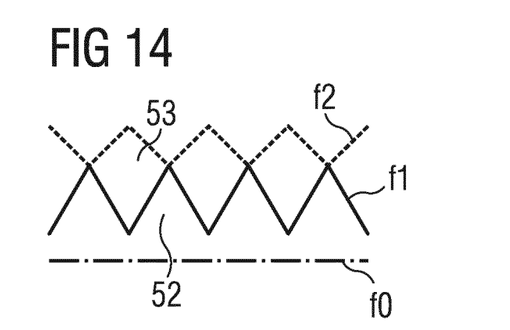
FIG. 14 shows a third variant how to arrange a region of porous material at the trailing edge section of a rotor blade.

The embodiment of FIG. 14 is similar to the one of FIG. 13, but the serrations of the second dividing line f2 are pointing away from the base line f0 instead of towards the base line f0.

Figure 15:
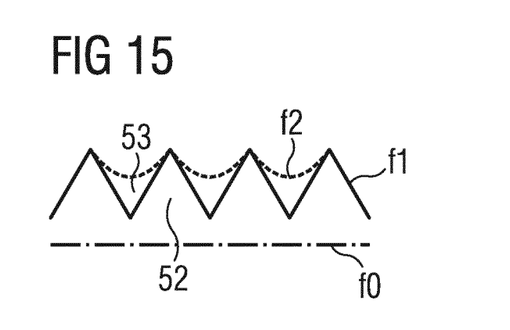
FIG. 15 shows a fourth variant how to arrange a region of porous material at the trailing edge section of a rotor blade.

The embodiment of FIG. 15 is also similar to the one of FIG. 13, but the serrations of the second dividing line f2 are smoothened—they actually resemble more comprising a wave form instead of serrations.

Figure 16:
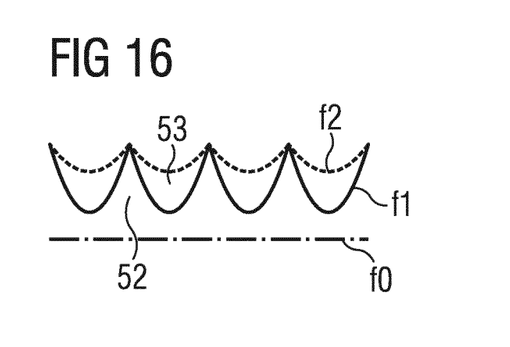
FIG. 16 shows a fifth variant how to arrange a region of porous material at the trailing edge section of a rotor blade.

In FIG. 16, both the first dividing line f1 and the second dividing line f2 comprise a wave form. Both dividing lines f1, f2 have the same periodicity.

Figure 17:
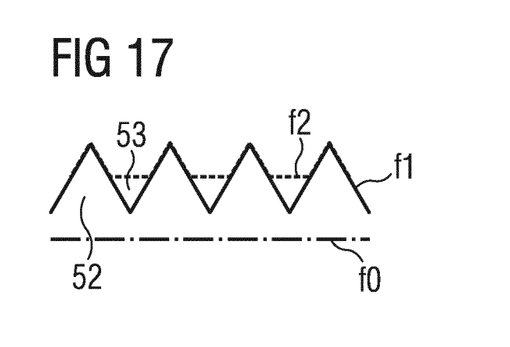
FIG. 17 shows a sixth variant how to arrange a region of porous material at the trailing edge section of a rotor blade.

In FIG. 17, the first dividing line f1 is serrated and the second dividing line is chosen such that only a part of the area between adjacent teeth of the first region 52 is filled with porous material, i.e. with the second region 53.

Figure 18:
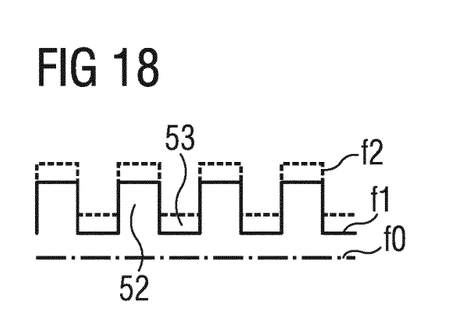
FIG. 18 shows a seventh variant how to arrange a region of porous material at the trailing edge section of a rotor blade.

In FIG. 18, both the first dividing line f1 and the second dividing line f2 resemble a pulse form. Both dividing lines f1, f2 have the same periodicity.

Figure 19:
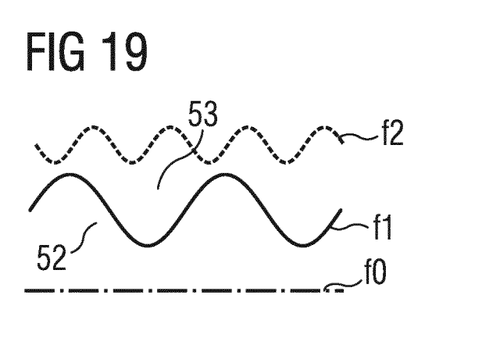
FIG. 19 shows an eighth variant how to arrange a region of porous material at the trailing edge section of a rotor blade.

In FIG. 19, both the first dividing line f1 and the second dividing line f2 comprise a wave form, in particular a sine wave form. The periodicity of the first dividing lines f1 differs from the periodicity of the second dividing line f2.

Figure 20:
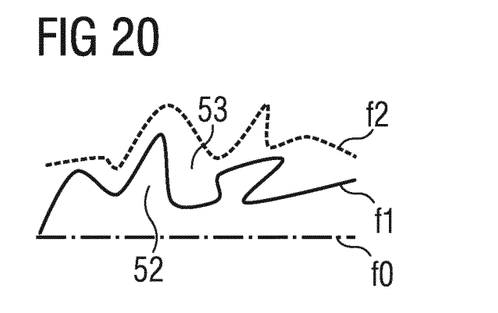
FIG. 20 shows a ninth variant how to arrange a region of porous material at the trailing edge section of a rotor blade.

In FIG. 20, both the first dividing line f1 and the second dividing line f2 have a random form, resulting in a chaotic pattern.

Figure 21:
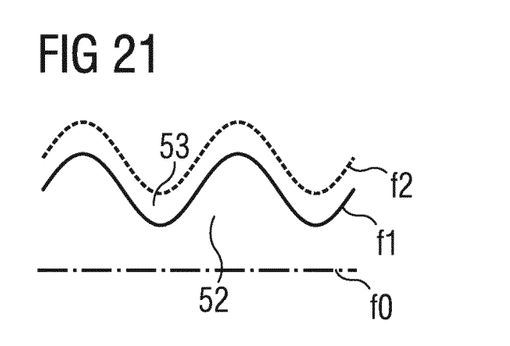
FIG. 21 shows a tenth variant how to arrange a region of porous material at the trailing edge section of a rotor blade.

The embodiment of FIG. 21 resembles FIG. 19, but both dividing lines f1, f2 having the same periodicity instead of differing periodicities.

Figure 22:
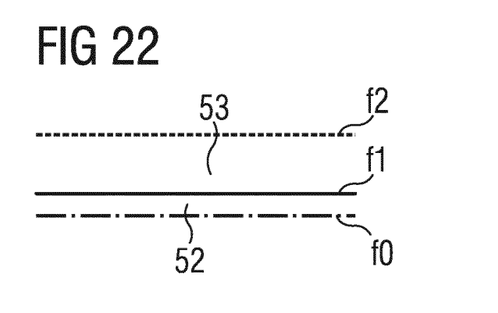
FIG. 22 shows an eleventh variant how to arrange a region of porous material at the trailing edge section of a rotor blade.

Finally, in FIG. 22, both the first dividing line f1 and the second dividing line f2 are straight.

Although the invention has been illustrated and described in greater detail with reference to the preferred exemplary embodiment, the invention is not limited to the examples disclosed, and further variations can be inferred by a person skilled in the art, without departing from the scope of protection of the invention.

For the sake of clarity, it is to be understood that the use of "a" or "an" throughout this application does not exclude a plurality, and "comprising" does not exclude other steps or elements.

The invention claimed is:

1. A noise reducing device for a rotor blade of a wind turbine, comprising:
   a panel configured to attach to the rotor blade of the wind turbine, the panel having a serrated portion and an attachment portion, the serrated portion having serrations extending along at least a portion of a trailing edge section when the panel is attached to the rotor blade, the serrations having at least a first tooth and a second tooth, the first tooth spaced apart from the second tooth, wherein the serrations are configured to not bend during operation of the wind turbine,
   wherein an area between the first tooth and the second tooth is at least partially filled with a porous material such that generation of noise in the trailing edge section is reduced, wherein a plurality of aerodynamic devices are mounted on the panel entirely upstream of the serrated portion with respect to an airflow from a leading edge section of the rotor blade to the trailing edge section and project from the panel, wherein the plurality of aerodynamic devices comprise at least one of a plurality of fixed fins and a plurality of fixed ridges, wherein the plurality of aerodynamic devices include at least one aerodynamic device aligned directly upstream of the first tooth, at least one aerodynamic device aligned directly upstream of the second tooth, and at least one aerodynamic device aligned directly upstream of the area between the first tooth and the second tooth, and wherein the plurality of aerodynamic devices are positioned to manipulate the airflow over the serrated portion, including the first tooth, the second tooth, and the porous material.

2. The noise reducing device according to claim 1, wherein an open area fraction of the porous material is greater than 10 per cent and/or smaller than 90 percent.

3. The noise reducing device according to claim 1, wherein the porous material is a mesh comprising a plurality of strands which are connected to each other in a regular pattern.

4. The noise reducing device according to claim 1, wherein the porous material is made of an open-cell foam.

5. A rotor blade for a wind turbine, comprising:
   an attachable panel, the attachable panel comprising non-bending serrations along at least a portion of a trailing edge section of the rotor blade,
   wherein an area between the non-bending serrations is at least partially filled with a plurality of fibers such that generation of noise in the trailing edge section of the rotor blade is reduced, and a plurality of aerodynamic fins projecting from the attachable panel, wherein the plurality of aerodynamic fins are located in an upstream region with respect to an airflow flowing from a leading edge section of the rotor blade to the trailing edge section, the upstream region being directly upstream with respect to a respective non-bending serration and a respective area between respective non-bending serrations, such that each aerodynamic fin of the plurality of aerodynamic fins is positioned between the leading edge section and at least one of the respective non-bending serration and the respective area between respective non-bending serrations located downstream from the leading edge, wherein a first subset of the plurality of the aerodynamic fins are entirely positioned and aligned upstream of the non-bending serrations with respect to an airflow from a leading edge section of the rotor blade to the trailing edge section and a second subset of the plurality of aerodynamic fins are entirely positioned and aligned upstream of the area between the non-bending serrations with respect to the airflow, wherein the first subset and second subset of the plurality of aerodynamic fins together manipulate the airflow over both the non-bending serrations and the plurality of fibers.

6. The rotor blade according to claim 5, wherein the fibers are arranged parallel to each other, in chordwise direction of the rotor blade.

7. The rotor blade according to claim 5, wherein the fibers are tapered in a direction towards a trailing edge of the rotor blade.

8. The rotor blade according to claim 5, wherein the plurality of fibers comprises at least one deflected fiber having a first portion located within a chordal plane of the rotor blade, and a second portion located outside the chordal plane of the rotor blade.

9. The rotor blade according to claim 8, wherein the second portion is adjacent to a trailing edge of the rotor blade.

10. The rotor blade according to claim 5, wherein the fibers are arranged such that a trailing edge of the rotor blade between a tip of the first tooth and a tip of the second tooth is formed by a straight line.

11. The rotor blade according to claim 5, wherein the fibers are arranged such that a trailing edge of the rotor blade between a tip of the first tooth and a tip of the second tooth is formed by a line which is deviating from a straight line in the direction towards a leading edge of the rotor blade.

12. The noise reducing device according to claim 1, wherein the aerodynamic fins are arranged on at least one of a pressure side and a suction side of the rotor blade.

13. A wind turbine with at least one noise reducing device according to claim 1.

14. The rotor blade according to claim 8, wherein the at least one deflected fiber is permanently deflected.

15. The noise reducing device according to claim 1, wherein a portion of the porous material is permanently deflected outside the chordal plane of the rotor blade.

* * * * *

UNITED STATES PATENT AND TRADEMARK OFFICE
CERTIFICATE OF CORRECTION

PATENT NO. : 11,220,993 B2
APPLICATION NO. : 15/574290
DATED : January 11, 2022
INVENTOR(S) : Asheim et al.

Page 1 of 1

It is certified that error appears in the above-identified patent and that said Letters Patent is hereby corrected as shown below:

On the Title Page

Item (57) ABSTRACT:
Delete "A method using machine learned, scenario based control heuristics including: providing a simulation model for predicting a system state vector of the dynamical system in time based on a current scenario parameter vector and a control vector; using a Model Predictive Control, MPC, algorithm to provide the control vector during a simulation of the dynamical system using the simulation model for different scenario parameter vectors and initial system state vectors; calculating a scenario parameter vector and initial system state vector a resulting optimal control value by the MPC algorithm; generating machine learned control heuristics approximating the relationship between the corresponding scenario parameter vector and the initial system state vector for the resulting optimal control value using a machine learning algorithm; and using the generated
machine learned control heuristics to control the complex dynamical system modelled by the simulation model."

And insert:
-- A rotor blade for a wind turbine is provided, wherein the rotor blade includes serrations along at least a portion of the trailing edge section of the rotor blade. The serrations include a first tooth and at least a second tooth, and the first tooth is spaced apart from the second tooth. The area between the first tooth and the second tooth is at least partially filled with porous material such that generation of noise in the trailing edge section of the rotor blade is reduced. Furthermore, the embodiments relate to a wind turbine including at least one such a rotor blade. --

Signed and Sealed this
Eighth Day of March, 2022

Drew Hirshfeld
*Performing the Functions and Duties of the
Under Secretary of Commerce for Intellectual Property and
Director of the United States Patent and Trademark Office*